United States Patent [19]

Kiyohara

[11] Patent Number: 4,777,427
[45] Date of Patent: Oct. 11, 1988

[54] DRIVING DEVICE FOR ELECTRO-LUMINESCENCE

[75] Inventor: Shuichi Kiyohara, Kanagawa, Japan

[73] Assignee: Canon Kabushiki Kaisha, Tokyo, Japan

[21] Appl. No.: 57,007

[22] Filed: Jun. 1, 1987

[30] Foreign Application Priority Data

Jun. 13, 1986 [JP] Japan ................... 61-136161

[51] Int. Cl.⁴ .............................................. G05F 1/10
[52] U.S. Cl. ...................................... 323/222; 323/223; 323/351; 323/905
[58] Field of Search ............... 323/222, 223, 320, 323, 323/325, 351, 905

[56] References Cited

U.S. PATENT DOCUMENTS

| 3,215,925 | 11/1965 | Rieke | 323/222 |
| 3,889,176 | 6/1975 | Randall | 323/223 |
| 4,238,710 | 12/1980 | Nelson | 323/222 |
| 4,473,875 | 9/1984 | Parsons et al. | 323/222 |
| 4,562,527 | 12/1985 | Klamt | 323/222 |

Primary Examiner—Patrick R. Salce
Assistant Examiner—Anita M. Ault
Attorney, Agent, or Firm—Robin, Blecker & Daley

[57] ABSTRACT

A device for driving an electro-luminescence in which an electrical power source, a coil and a switching means are connected in series to each other. The switching means is time-serially opened and closed by a control unit, and is connected in parallel to the electro-luminescence.

10 Claims, 3 Drawing Sheets

DRIVING DEVICE FOR ELECTRO-LUMINESCENCE

BACKGROUND OF THE INVENTION

1. Field of the Invention

This invention relates to driving devices for electro-luminescence units, and more particularly to driving devices for electro-luminescence units in instruments operating with a electrical power source of low voltage such as battery.

2. Description of the Related Art

To produce electro-luminescence of high intensity, an AC voltage of more than several tens of volts must be applied to an electro-luminescence unit. For the instrument equipped only with an electrical power source of low voltage (several volts) such as the dry battery, it has, therefore, been a general practice in the prior art to make use of a DC-AC converter as the means for producing an alternating increased voltage by which the electro-luminescence unit is driven.

FIG. 5 illustrates a conventional example of the driving device for electro-luminescence units whose boosting circuit employs such a DC-AC converter.

In FIG. 5, so long as a control unit 6 renders non-conducting a transistor 5, a transistor 2 having associated resistors 3 and 4 is non-conducting so that a DC-AC converter circuit is in a inoperative state.

When the control unit 6 changes the transistor 5 to the conducting state, the transistor 2 is also rendered conductive and battery 1 is connected with the DC-AC converter circuit, initiating operation thereof.

As the electrical power is supplied to the DC-AC converter circuit, current flows through a resistor 8 into the base of a transistor 7. When the transistor 7 starts to transit from the non-conducting to the conducting state, current flows into a tap, b, of a boosting transformer 10 through the collector-emitter path of the transistor 7. Thereby, a positive voltage is caused to appear at another tap, c, of the boosting transformer 10. Therefore, current flows through a capacitor 9 to the base of the transistor 7 and the transistor 7 transits to progressively more conductive states.

In a certain time from the start of transition of the transistor 7 from the non-conductive to the conductive state, the transistor 7 reaches a full conductive state. From this time onward, the voltage applied to the tap, b, of the boosting transformer 10 does not increase. Therefore, at this point in time, the voltage produced at the tap, c, of the boosting transformer 10 starts to decrease. This causes flow of current to the base of the transistor 7 through the capacitor 9 in a direction to render the transistor 7 less conductive. The decreasing of the voltage produced at the tap, c, of the boosting transformer 10 proceeds further and, the transistor 7 reaches the totally non-conductive state. Such procedure then repeats itself.

By the recycling of turning on and off of the transistor 7, the voltage at the tap, b, of the boosting transformer 10 is changed intermittently. This changing is reflected in a boosted AC voltage across the ends, a and d, of the winding of the boosting transformer 10. Using this voltage, the electro-luminescence unit 11 is driven.

As is seen in FIG. 5, the above-described type of electro-luminescence driving circuit using such a DC-AC converter has numerous parts. Also, because of its using the boosting transformer, it is difficult to minimize the size and weight of the device. In application to portable instruments using dry batteries as the electrical power source, therefore, shortcomings existed in that the portability was reduced, and a high production cost was required.

SUMMARY OF THE INVENTION

It is, therefore, an object of the invention to eliminate the above-described shortcomings of the prior known device, and to provide a driving device for eletro-luminescence of reduced size and weight and a low price.

The present invention has features that the electrical power source, a coil and switching means are connected in series with each other, that the control unit time-serially opens and closes the switching means and that the switching means and the electro-luminescence unit connected in parallel with each other.

In another embodiment of the invention, the electrical power source, a coil and switching means are connected in series with each other, and the control unit time-serially opens and closes the switching means. Further, a diode is connected between the coil and the main electrode of the switching means in the forward direction, and the series circuit of the diode and the switching means is connected in parallel to the electro-luminescence unit.

DETAILED DESCRIPTION OF THE PREFERRED EMBODIMENTS

Figure 1:
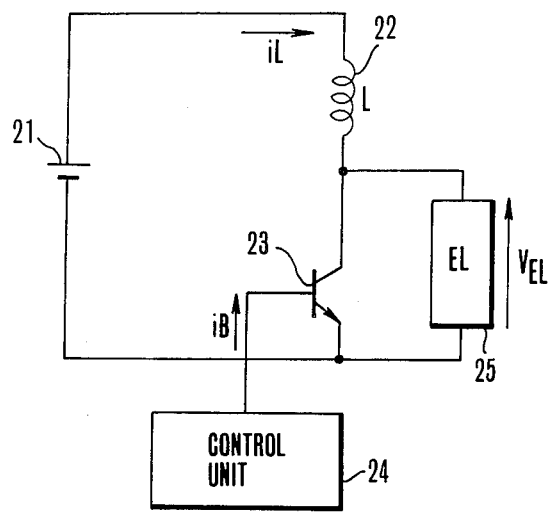
FIG. 1 is an electrical circuit diagram of an embodiment of the driving device for electro-luminescence according to the present invention.
Figure 2:
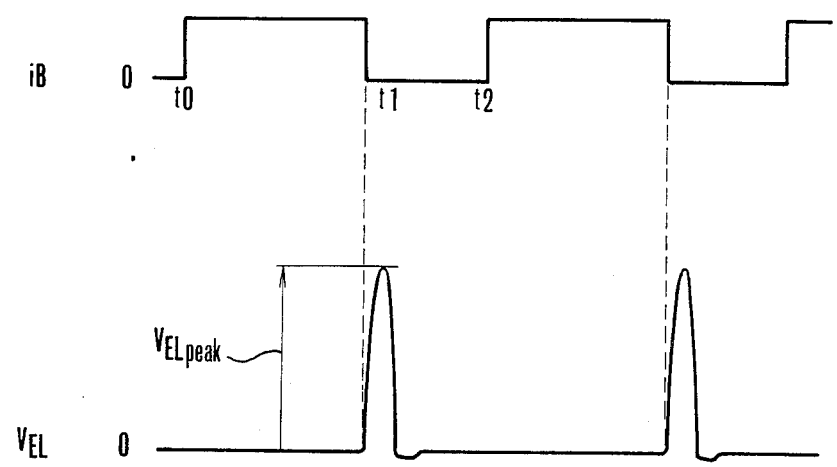
FIG. 2 shows waveforms illustrating a manner in which the device of FIG. 1 operates.

In the following, a first embodiment of the present invention is described on the basis of FIGS. 1 and 2.

A battery 21, a coil 22 and a switching npn transistor 23 having two main electrodes, a collector and an emitter, are connected in series with each other. A control unit 24 is connected to the control electrode or base of the transistor 23 to time-serially control the switching or opening and closing operation of the transistor 23. An electro-luminescence unit (EL) 25 is connected between the collector and emitter of the transistor 23. The control unit 25 is an oscillator of known construction which starts to oscillate in response to actuation of a control switch (not shown).

The operation of the device of construction described above is described by using the waveforms of FIG. 2.

At a time $t_0$ when the control unit 24 flows a current $i_B$ into the transistor 23, the latter is rendered conductive, and flow of a current $i_L$ from the battery 21 to the coil 22 commences. Then, because of the inductance of the coil 22, the intensity of the current $i_L$ gradually increases. In a certain time from the time point $t_0$, the control unit 24 discontinues application of differential voltage across the base-emitter path of the transistor 23, so that the transistor 23 is rendered non-conductive at a time point $t_1$.

Letting that value of the current $i_L$ which is taken just before the transistor 23 reaches the non-conducting state be denoted by $i_L(t_1)$, the energy $W_L$ stored on the coil 22 up to the time point $t_1$ is given by the following expression:

$$W_L = L(i_L(t_1))^2/2 \qquad (1)$$

where L is the inductance of the coil 22.

And, since, at the time point $t_1$, the transistor 23 has become non-conducting, resonance due to the inductance of the coil 22 and the static capacitance $C_{EL}$ of the EL 25 starts to take place. By this resonance, the energy on the coil 22 is all transferred to the EL 25. As a result, a peak voltage ($V_{ELpeak}$) appears across the ends of the EL 25, where $V_{ELpeak} >> V_{BAT}$ (the voltage of the battery 21). For this case, we have $$C_{EL}(V_{ELpeak})^2/2 \div W_L \qquad (2)$$

From (1) and (2), an equation for the peak voltage $V_{ELpeak}$ is obtained as follows:

$$V_{ELpeak} \div i_L(t_1)\sqrt{L/C_{EL}} \qquad (3)$$

Therefore, from the time $t_1$ onward, the voltage $V_{EL}$ across the EL 25 is gradually rising. When it reaches the peak voltage $V_{ELpeak}$, for this time, the energy stored on the EL 25 starts to move toward the coil 22, and the voltage $V_{EL}$ starts to gradually decrease. When the voltage $V_{EL}$ becomes negative, the potential of the collector of the transistor 23 becomes negative with the conduction of the collector-emitter path. Therefore, the energy stored on the coil 22 and EL 25 is consumed and the resonating stops.

After that, in a certain time space, the control unit 24 renders the transistor 23 conducting again at a time point $t_2$ by flowing the current $i_B$ to its base. Accordingly, the above-described procedure repeats itself.

In accordance with the invention, the period of conducting and non-conducting of the transistor 23 is made so short by the control unit 24 that to the human eye the sequence of pulses of emission of light from the EL 25 appears to be continuous and uniform in intensity owing to the aferimage effect.

Figure 3:
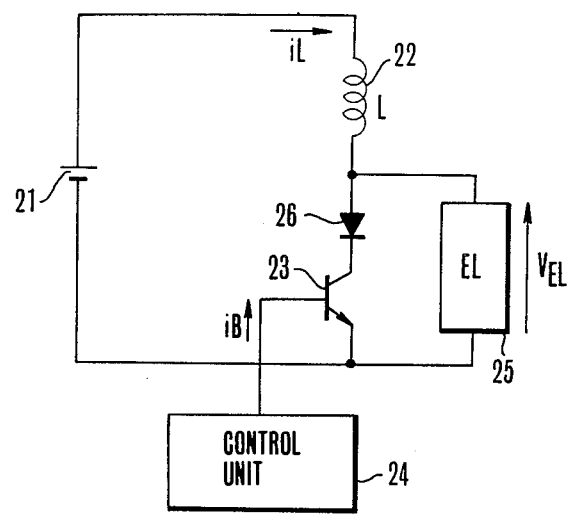
FIG. 3 is an electrical circuit diagram of another embodiment of the present invention.
Figure 4:
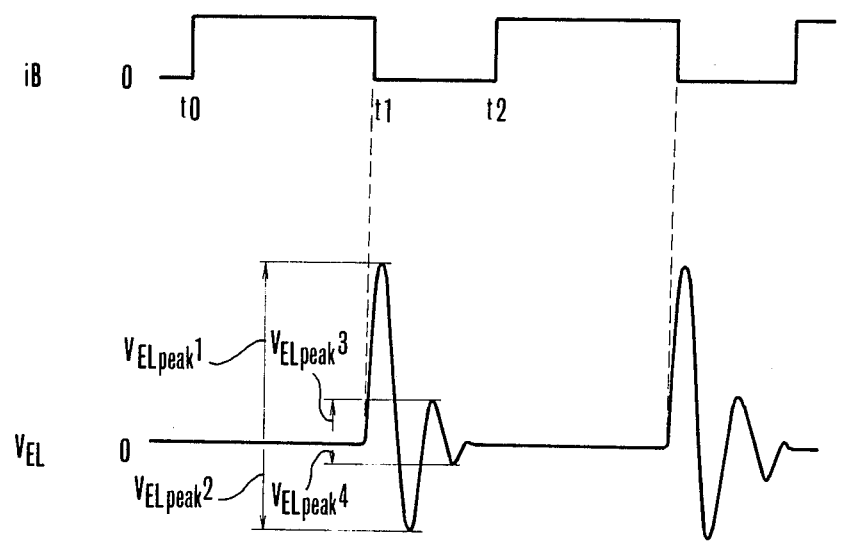
FIG. 4 shows waveforms illustrating a manner in which the device of FIG. 1 operates.
Figure 5:
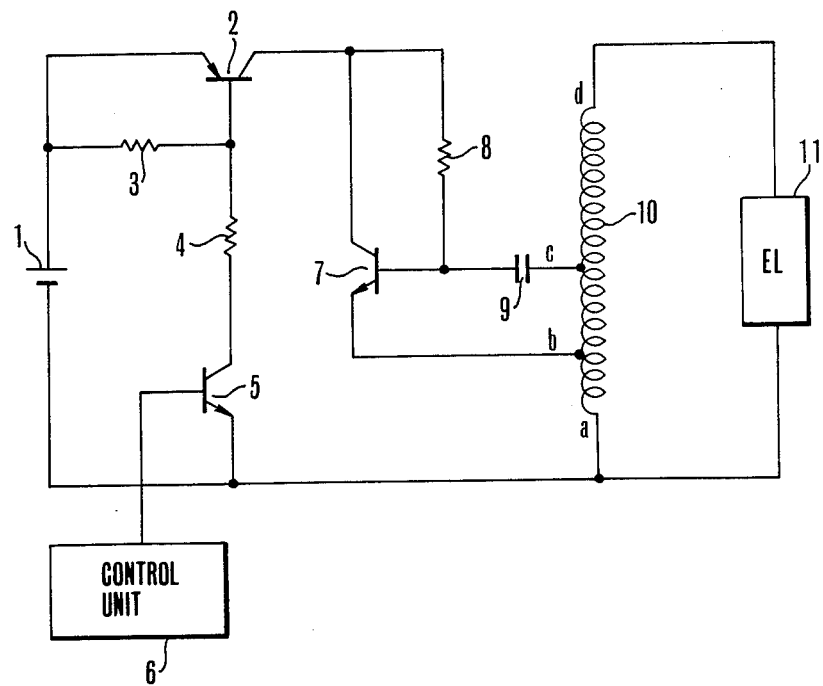
FIG. 5 is an electrical circuit diagram of the conventional example of the driving device for electro-luminescence.

FIG. 3 illustrates another embodiment of the invention, and its operation is shown in FIG. 4. For the purpose of simplifying explanation, the same reference characters have been employed to denote the similar parts to those of the foregoing embodiment, and only their difference is described below.

In this embodiment, a unidirectional semi-conductor element in the form of a diode 26 is connected in forward direction to the collector of the transistor 23, and the series circuit of the diode 26 and the transistor 23 is connected in parallel to the EL 25. The cathode of diode 26 is connected to the collector of the transistor 23.

Similarly to the above-described first embodiment, the control unit 24 controls the conducting and non-conducting operation of the transistor 23. As for the voltage $V_{EL}$ across the ends of the EL 25, its level starts to rise gradually at the time point $t_1$. After the peak voltage is reached, it gradually falls, becoming negative. Though the diode 26 is rendered non-conducting, such a rapid energy consumption as in the foregoing embodiment does not take place. Hence, the resonating continues. Letting the first peak value of the voltage $V_{EL}$ counting from the time point $t_1$ be denoted by $V_{ELpeak}1$ as shown in FIG. 4, the next one by $V_{ELpeak}2$ and the third by $V_{ELpeak}3$, because there is a loss with the coil 22 and EL 25, we have $$|V_{ELpeak}1| > |V_{ELpeak}2| > |V_{ELpeak}3| > \qquad (4)$$

The $V_{ELpeak}1$ is almost equal to the $V_{ELpeak}$ of the above-described first embodiment.

And, whilst, in the first embodiment, the resonating lasted for only half period, it is in this or second embodiment that the resonating continues even after the half period although the voltage is gradually decreasing. This prolongation of the time for which the EL 25 emits light leads to increase the brilliance of the EL 25 over the first embodiment.

As has been described above, the present invention has achieved a great reduction of the number of parts, thereby giving an advantage that the device can be formed to a smaller size and lighter weight and manufactured to a lower price. This makes the device suitable for use in portable instruments such as cameras using batteries as the electrical power source.

What is claimed is:

1. A driving device for use with an electrical power supply having a given terminal voltage for electro-luminescence, comprising:
   (a) a series circuit for connection to said electrical power supply, said series circuit having a coil and an electrical switching means having main electrodes and a control electrode;
   (b) control means for applying signals to said control electrode of said switching means to render said switching means alternately conductive and non-conductive; and
   (c) electro-luminescence means connected in parallel to said switching means, the inductance value of said coil and the capacitance value of said electro-luminescence means being selected to effect resonance and application of a voltage to said electro-luminescence means in excess of said terminal voltage of said electrical power supply.

2. A driving device according to claim 1, wherein said switching means includes a semiconductor element.

3. A driving device according to claim 2, wherein said semiconductor element includes an npn transistor.

4. A driving device for use with an electrical power supply having a given terminal voltage for electro-luminescence, comprising:
   (a) a series circuit for connection said electrical power supply, said series circuit having a coil, an electrical switching means having main electrodes and a control electrode and a unidirectional semiconductor element connected in forward direction between said coil and one of the main electrodes of said switching means;
   (b) control means for applying signals to said control electrode of said switching means to render said switching means alternately conductive and non-conductive; and
   (c) electro-luminescence means having a first terminal connected to a junction point between said coil and said unidirectional semiconductor element and a second terminal connected to a main electrode of said switching means, the inductance value of said coil and the capacitance value of said electroluminescence means being selected to effect resonance and application of a voltage to said electroluminescence means in excess of said terminal voltage of said electrical power supply.

5. A driving device according to claim 4, wherein said switching means includes a semiconductor element.

6. A driving device according to claim 5, wherein said semiconductor element includes an npn transistor.

7. A driving device according to claim 6, wherein said one-way element includes a diode having two electrodes.

8. A driving device according to claim 7, wherein a cathode of said diode is connected to a collector of the transistor.

9. A driving device for use with an electrical power supply having a given terminal voltage for electroluminescence, comprising:
   (a) a series circuit for connection to said electrical power supply, said series circuit having a coil and an electrical switching means having main electrodes and a control electrode;
   (b) control means for applying signals to said control electrode of said switching means to render said switching means alternately conductive and non-conductive; and
   (c) a light-emitting element connected in parallel to said switching means, the inductance value of said coil and the capacitance value of said light-emitting element being selected to effect resonance and application of a voltage to said light-emitting element in excess of said terminal voltage of said electrical power supply.

10. A driving device for use with an electrical power supply having a given terminal voltage for electroluminescence, comprising:
   (a) a series circuit for connection to said electrical power supply, said series circuit having a coil, an electrical switching means having main electrodes and a control electrode and a unidirectional semiconductor element connected in forward direction between said coil and one of the main electrodes of said switching means;
   (b) control means for applying signals to said control electrode of said switching means to render said switching means alternately conductive and non-conductive; and
   (c) a light-emitting member having a first terminal connected to a junction point between said coil and said unidirectional semiconductor element and a second terminal connected to a main electrode of said switching means, the inductance value of said coil and the capacitance value of said light-emitting member being selected to effect resonance and application of a voltage to said electro-luminescence means in excess of said terminal voltage of said electrical power supply.

* * * * *